Figure 1:
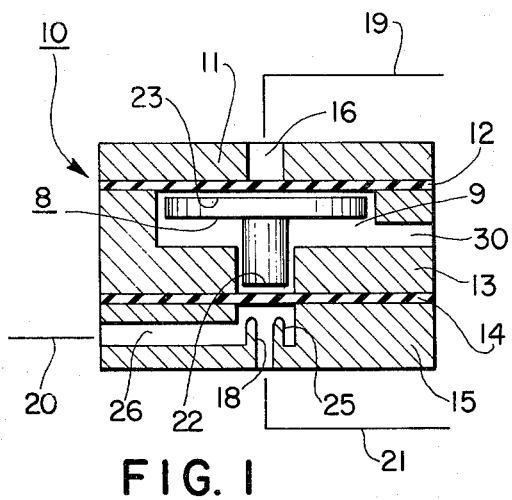

United States Patent [19]

Cowan

[11] 3,897,041

[45] July 29, 1975

[54] FLUID FLOW CONTROL ELEMENTS WITH AREA DIVIDING INSERTS

[75] Inventor: Larry C. Cowan, Saunderstown, R.I.

[73] Assignee: Leesona Corporation, Warwick, R.I.

[22] Filed: Aug. 20, 1973

[21] Appl. No.: 390,123

[52] U.S. Cl. ............ 251/61.1; 137/625.6; 251/61.2
[51] Int. Cl.² ....................................... F16K 31/365
[58] Field of Search ....... 251/61.1, 61.2; 137/625.6, 137/625.66, 82; 235/201 ME

[56] References Cited
UNITED STATES PATENTS

| | | | |
|---|---|---|---|
| 3,076,477 | 2/1963 | Brandenberg | 137/625.6 |
| 3,326,239 | 6/1967 | Saint-Joanis et al. | 137/625.66 |
| 3,559,945 | 2/1971 | Coiner | 235/201 ME X |
| 3,601,155 | 8/1971 | Brown | 137/625.66 |
| 3,604,460 | 9/1971 | Delrue | 137/625.66 |
| 3,653,408 | 4/1972 | Coiner | 137/625.6 |
| 3,769,994 | 11/1973 | Hirao | 251/61.1 X |
| 3,776,277 | 12/1973 | Nagashima | 137/625.6 |

*Primary Examiner*—Henry T. Klinksiek
*Attorney, Agent, or Firm*—Albert P. Davis; Burnett W. Norton

[57] ABSTRACT

In order to provide fast response to control signals for modifying high pressure fluid flow paths such as air at 80 psi through large orifices by use of thin flexible diaphragms, a movable control element is positioned with two ends disposed between two thin impervious flexible diaphragms which can be deflected to move the element in opposite directions. Pressure chambers acting on each diaphragm cause the control element to move as a function of the differential pressure. In one pressure chamber positioned in alignment with one end of said control element is a valve nozzle through which the controlled fluid flows. Thus the control element may squeeze the diaphragm against the nozzle to control fluid flow in response to fluid input pressures.

This basic control element is used variously as a flow amplifier, a threshold detector, a latching thyratron type relay, and a pressure divider, with the control element having opposite end contact surfaces of different area used to vary the ratios of differential pressure which may move the element into a valve control position.

A further movable element is used as a biasing source to oppose the movement of the control element in proportion to fluid control pressure bearing thereupon. The "Not" function of inverting signals is achieved by overcoming the biased element tending to close a vented nozzle with an input signal to open the vent and reduce the pressure of the biasing source.

15 Claims, 6 Drawing Figures

PATENTED JUL 29 1975  3,897,041

FLUID FLOW CONTROL ELEMENTS WITH AREA DIVIDING INSERTS

This invention relates to fluid logic control circuits and more particularly it relates to logic elements having impervious flexible diaphragms responsive to control fluid flow paths by flexing in response to differential pressure of input signals on opposite sides of the diaphragm.

PRIOR ART AND OBJECTIVES

Fluid logic elements with thin flexible impervious elastomeric diaphragms are well known in the art. Thus, a fluid flow path through a valve nozzle may be controlled by a flexing signal to the diaphragm which tends to close or open the nozzle for flow of fluid therethrough. However in the prior art the fluid volume that can be controlled quickly by a thin and thus quick acting diaphragm is limited by the tendency of the diaphragm to enter the nozzle when it is made larger, thus deforming the diaphragm and causing it to age rapidly.

It is therefore a general object of this invention to provide improved fluid logic control devices which may control greater flow volumes and which thus act as power amplifier devices.

With the possibility of controlling large flow volumes at high fluid pressures, the logic control functions may be simplified by use of fewer control elements to perform a variety of circuit functions. It is desirable to have standard logic control elements of a universal nature that may be used to perform various logic control functions. Among these desirable functions is interfacing between an operative fluid control system and other systems which may operate mechanically or with other fluids at different flow rates or at other pressures. Modulation of a flow source in a substantially linear manner is also desirable as well as snap-action triggered switching between "on" and "off" conditions. Detection of thresholds, reversal of signal polarities, proportional division of signal amplitudes, and latched-in control of flow paths are all desirable functions in universal type logic elements.

Therefore it is another object of this invention to provide universal type logic elements and corresponding circuits for performing a variety of fluid path control functions.

More specific objects of the invention include provision of simple, effective circuits using a single logic element which may directly control output utilization devices for amplification, modulation, signal proportioning, latching, threshold sensing and other logic control functions desirable in fluid logic systems generally operating with both or either pulse type digital on-off fluid pressure signals and analog type signals of varying fluid pressure.

SUMMARY OF THE INVENTION

Thus in accordance with this invention a movable control member, which may have its opposite ends of different surface area, is confined between two thin flexible impervious elastomeric diaphragms for axial movement in response to flexing of the diaphragms in response to differential pressures supplied by signal sources such as air at 80 psi coupled to bear upon the diaphragms. One fluid pressure may be established by a pilot or control signal and the other may be the pressure of a fluid flow source similar to a power supply, for example.

For control of a flow path, one end of the movable member squeezes the flexible diaphragm against a flow path control nozzle to meter fluid flow therethrough. By varying the areas of the end portions of the control member which contact the respective diaphragms response to the differential pressure magnitudes may be varied. The movable control member may also be used as a biasing member fashioned to oppose the closing of the fluid flow path by pressure of one diaphragm against the nozzle.

By employing these features various advantages are realized. A signal may be inverted and thus a "Not" function is achieved to overcome the bias closing the control nozzle by means of a further control member extending through the nozzle. A further diaphragm flexed by the signal to be inverted operates the further control member.

The squeezing of the diaphragm against the nozzle by the control member solves some serious problems by inhibiting vibration or resonance tendencies of a flexible diaphragm, and preventing the aging of the diaphragm and changing of operating characteristics because of the tendency of the diaphragm otherwise to take a set conforming to the nozzle shape.

Further features, objects and advantages of the invention will be found throughout the following more detailed description of the invention and several preferred embodiments thereof, which are shown in the accompanying drawing.

IN THE DRAWING

Figure 2:
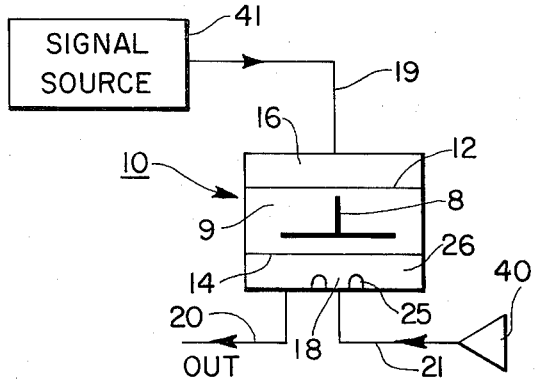
Figure 3:
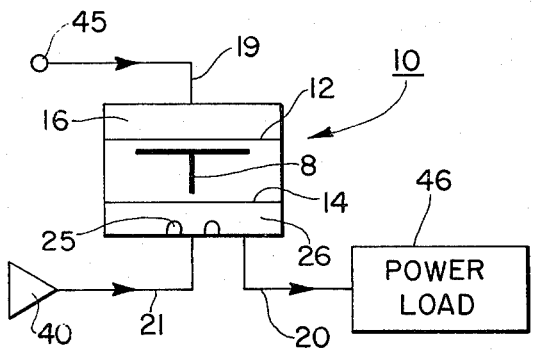
Figure 4:
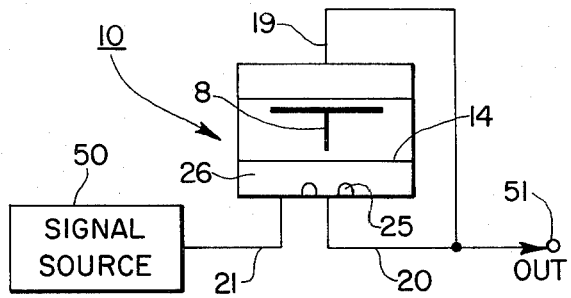
Figure 5:
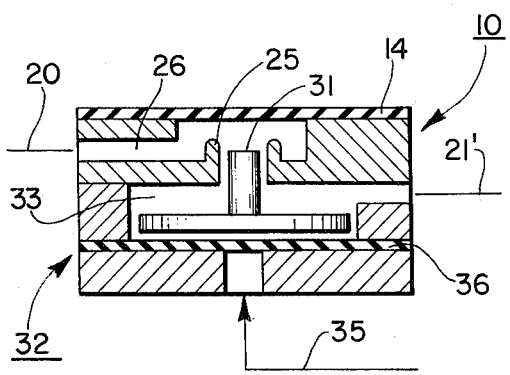
Figure 6:
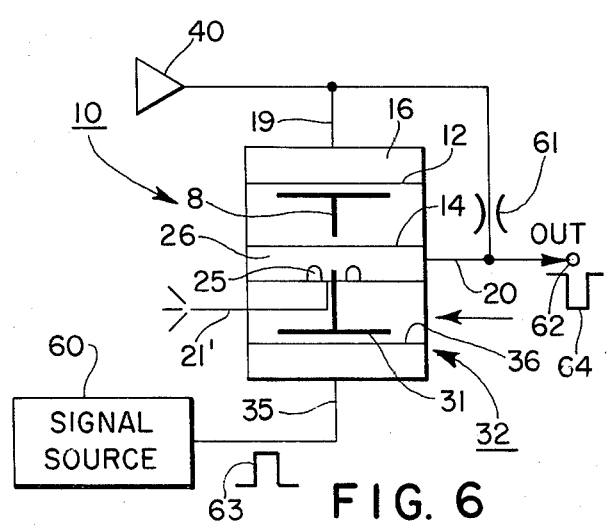

FIG. 1 is a sketch, partly in section, of a cylindrical cavity embodiment of a fluid logic control element afforded by this invention, FIGS. 2 to 4 are schematic diagrams of fluid control circuits embodying the element of FIG. 1 respectively for latching relay, flow amplification and signal division applications, FIG. 5 is a sketch, partly in section of a further cylindrical cavity logic control element embodiment of the invention, and FIG. 6 is a schematic diagram of a further fluid control circuit embodiment operable as a threshold sensor and signal inverter.

LOGIC DEVICE CONSTRUCTION DETAILS

A logic fluid control element is constructed in typical fashion with a cylindrical control element 8 movable through a limited axial path within a surrounding cavity 9 in housing member 10 formed as a sandwich of cover 11, diaphragm 12, spacer 13, diaphragm 14 and valve member 15. Each diaphragm (exaggerated in thickness) is a thin flexible elastomeric impervious member that may be flexed instantaneously by fluid pressure such as that applied at pilot signal input port cavity 16, or cavity 26 communicating with fluid flow passageway ports 26, 18. Thus signals may be used to flex the diaphramgs toward each other through pressure built up in fluid flow lines 19, 20 and 21 (shown schematically).

As each diaphragm is so flexed it will contact the respective smaller end 22 or larger end 23 of the movable control member 8 over a predetermined portion of the diaphragm area. The movable control member 8 is not attached to the diaphragms and the ends are movable relative to the contact surfaces of the diaphragms therewith. Depending upon the differential pressures upon the two diaphragms 12, 14 and the areas of ends 22, 23 of movable control member 8, it may be moved axially toward or away from the control valve nozzle 25 extending into flow pressure compartment 26 with rounded terminal contact surface structure for engaging diaphragm 14 when deflected to control fluid flow through the path 20–21. Thus the movable control member 8 under influence of pressure at signal input lead 19 will press the end 22 to squeeze diaphragm 14 against the flow nozzle surface of valve 25. Because of the rounding of the nozzle contact surface and the greater flattened area of end surface 22, the control member bears against and squeezes diaphragm 14 into the nozzle outlet of valve 25 in such fashion that the flow of fluid through the nozzle may either be quickly stopped by snap action of digital on-off type control signals or can be used in an analog fashion to partly restrict flow in the passageway in a substantially linear fashion. The signal flow passageway 18 because of the control of valve member 25 in this fashion may be made larger in diameter than possible in prior art devices to control high pressure signals without the danger of sucking or blowing diaphragm 14 into the nozzle, and thus this element may serve as a power amplifier or power gate device in a single stage handling large flows of fluid at high pressure to an output load.

This element is also by employment of movable control member 8 adapted to interface between different pressure ranges of control sources, different fluids and different kinds of signals including even mechanical movement of levers, etc., e.g. providing a movement force to control member 8 through control passageway 16. Diaphragm 12 is impervious so that any fluid source passing through line 19 is isolated from the output flow path 20–21. Thus pneumatic output signals could be controlled by hydraulic pilot control signals if desired. Because of the ability to control amplification and division of signal pressures by this device, as will hereinafter be explained in more detail, the fluid pressures, the fluid media, or the fluid flow volumes in input line 19 may be adapted to interface with a wide range of conditions to control the high-pressure, high-fluid-volume flow path 20–21.

Chamber 9 is vented at 30 to permit free movement of movable member 8 in response to pressures at ends 22, 23 as established through respective diaphragms 14, 12. The relative differential pressures which cause movable control member 8 to control valve 25 may be predetermined by selection of the areas of ends 22, 23 which contact the diaphragm and the areas upon which pressure is exerted on the opposing diaphragm faces. For example, the compartment 26 provides a known area at which fluid under pressure may strike diaphragm 14 to force it upward, and conversely the area of end 22 is known which provides a downward force. Thus the pressure-area product effectively establishes the ratio of forces operational at either diaphragm to control the movement of member 8. The gain or sensitivity of the controls therefore may be changed by changing the end contact surface areas of the movable member 8. For example the larger end may be up or downwardly directed with obvious minor variations to the cavity 9 of the control element of FIG. 1. Also the cavities 16 and 26 may be reduced in area or expanded for a conventional application of the pressure-area differentials attainable by use of the control member 8 or the diaphragms actuating it at either end.

The movable control element 8 of FIG. 1 may be considered a fluid biasing source for urging diaphragm 14 downward toward closure of valve 25. A different movable control element embodiment 31 of FIG. 5 may be considered a fluid biasing source for urging the corresponding diaphragm 14 upward away from valve closure position. The two logic devices 10 of FIG. 1 and 32 of FIG. 5 may be sandwiched together into a single element if desired for biasing control of diaphragm 14 in both valve closure and valve opening senses as will be seen later in the embodiment of FIG. 6. In the device 32, the chamber 33 about movable element 31 may be used as a fluid flow passageway equivalent to 18–21 of FIG. 1. A further control lead 35 in this embodiment actuates diaphragm 36 which will tend to move control element 31 upwardly toward diaphragm 14 and push the smaller end of the movable control element 31 through valve 25 and into contact with diaphragm 14 urging the nozzle into an open flow position.

CONTROL CIRCUIT SCHEMATIC REPRESENTATION

As seen by common reference characters, the element of FIG. 1 is shown schematically in the FIG. 2 circuit configuration. The schematic symbol 40 indicates a source of fluid supply, generally under a known constant pressure such as 80 psi. The signal source 41 provides a variable signal such as an analog fluid pressure variation or a digital on-off type input pressure flow pulse impinging upon diaphragm 12. The movable control element 8 has its lower end of larger diameter than its upper end in this embodiment.

LATCHING RELAY OPERATION

The circuit embodiment of FIG. 2 exemplifies operation of the logic device 10 in a thyratron-type gating function where a trigger control pressure at signal source 41 may be used to latch the flow path 21 to 20 in a condition where further signals at 41 will have no control until the flow from source 40 is discontinued. This type of logic circuit is desirable for example as an alarm which continues after triggering until turned off by stopping flow from source 40.

In this operational mode the signal source 41 pressure is normally high so that movable control plunger element 8 is seated against valve 25 to seal it before the source 40 is actuated to tend to flow fluid in the direction through chamber 26 out line 20. The area of port 18 and nozzle of valve 25 in contact with diaphragm 14 then is not large enough to permit fluid pressure from source 40 to open the valve 25. However, whenever a drop in the pressure of the signal source 41 occurs, then the valve 25 is opened and fluid flows through the path 21–26–20 continuously even when the full pressure on source 41 is restored because of the larger area in compartment 26 bearing upon the larger end of movable control member 8 to overcome the force on the smaller end. However, if the flow from source 40 is interrupted, then the valve 25 will again close, and the signal source 41 will provide a pressure-area product that is greater than that of the flow source 40. Different source pressures can be made operable with different end area dimensions of the movable control element 8.

FLOW AMPLIFIER OPERATION

As may be seen in FIG. 3, an input source of analog or digital pilot signals at terminal 45 may pass into blind control compartment 16 a substantially flowless pressure variation to exert a pressure through diaphragm 12 on the large end of movable control member 8. Thus a pilot signal will squeeze the diaphragm 14 against the nozzle portion of valve 25 and modulate a large flow of fluid from flow source 40 into line 21, compartment 26 and out line 20 to power load device 46. The flow lines and valve structure 25 may have a large diameter such as one-half inch because of the support of the diaphragm by the control member 8 and its action in squeezing the diaphragm against the nozzle of valve 25, where otherwise a flexible diaphragm would not suffice. Therefore this invention provides a power amplifier device for the direct control of a significant power flow which can be handled quickly in a single element retaining the fluid isolation and fast control properties of the thin flexible impervious elastomeric diaphragm.

SIGNAL PRESSURE DIVISION OPERATION

The circuit of FIG. 4 provides a pressure divider arrangement that will produce from a constant pressure signal source 50 of for example 80 psi a divided output pressure signal at terminal 51 of for example 15 psi. If an analog signal within proper pressure limits is provided the output will be divided in the same ratio. Typical dimensions for attaining this division ratio are diameters of 0.187 inch and 0.625 inch for the movable control element with a 0.125 inch diameter nozzle seat.

The division is attained by feeding back a portion of the output signal flow through valve 25 into pilot lead 19. Thus when the output flow pressure is large enough, the valve 25 is closed by squeezing diaphragm 14 thereagainst by action of control member 8. This stops the flow and output pressure so that the valve cannot be maintained in closed position. Thus, the output pressure will find a value at which the flow and feedback paths can maintain the valve in a partly closed position to stabilize the output pressure at a predetermined fraction of the input pressure to flow fluid through path 50, 21, 26, 20, 51.

AIR BIASED THRESHOLD OPERATION

As may be seen by corresponding reference characters in FIG. 6, the device is a combined sandwich of the embodiment of FIGS. 1 and 5. This embodiment serves to invert the signals from signal source 60 such as positive going pulse type digital signal 63 to provide at output terminal 62 the negative going output pulse 64, which for example goes from substantially an 80 psi level provided by fluid source 40 to substantially atmospheric pressure established by flow through the path 20, 26, 25, 21 when diaphragm 14 does not close valve 25. In order to permit the output lead 62 to attain the lower level, a restriction resistor 61 is provided in the flow path from source 40 to output terminal 62.

In operation, the source 40 fluid flows into compartment 16 to bias movable control element 8 toward diaphragm 14 tending to close the valve 25 and prevent flow to atmosphere through lead 21, thereby maintaining substantially source pressure at the output terminal 62. This control member 8 acts as a spring return member into this position, which is overcome by signal action on the further movable control element 31 which pushes against diaphragm 14 and the movable control element 8 in a direction tending to open the orifice of valve 25 and vent chamber 26 to atmosphere through vent line 21.

By choice of the areas at the larger end of movable control elements 8 and 31, the amount of bias pressure force and signal pressure force may be varied. The biasing force on movable control member 8 serves as a threshold which must be overcome before the output pressure 64 drops to its lower value. Thus, if the signal source 60 provides an analog type varying pressure signal, the output wave will sense the input signal excursions over the threshold bias level afforded by movable control element 8.

The foregoing embodiments are believed to set forth the nature and novel features of the invention, the spirit and scope of which is defined with particularity in the appended claims.

What is claimed is:

1. A fluid logic amplifying control device for controlling a fluid flow path in response to a fluid pressure control force, comprising in combination, a movable control member having two opposing ends thereof presenting two surface contact areas, a fluid flow valve structure disposed for control by one of said ends and presenting a nozzle with contact surface structure thereabout smaller in surface contact area than that of one said end, whereby that end will overlap the nozzle contact surface, said nozzle structure including means for retaining between said one end and the valve a flexible diaphragm configuration that prevents fluid from distorting the diaphragm shape to extend into the nozzle under influence of fluid pressure, a pair of impervious flexible diaphragms disposed to contact the opposite said ends of said control member thereby to move it when flexed thereagainst, a first one of said diaphragms and its contact surface thereof with one end of said control member being relatively movable with respect to each other, said first one of said diaphragms being disposed between said control member and said valve structure, a pair of pressure control chambers disposed adjacent each diaphragm to receive fluid flow under pressure for flexing said diaphragms against respective ends of said control member to thereby move it in opposite directions as a sole function of differential fluid pressures in said two control chambers on said diaphragms, a fluid flow path through said valve of an extended larger area permitting greater fluid flow volume in a first said chamber than in the second whereby in response to a smaller flow of fluid said one end of said control member may squeeze said first diaphragm against said nozzle to control a greater flow therethrough in response to differential pressure on said diaphragms in said pressure control chambers to effect amplification, and a housing holding said movable control member between said diaphragms for movement in and out of contact with said nozzle.

2. A combination as defined in claim 1 wherein said control member has a larger contact area at one end than the other.

3. A combination as defined in claim 2 with the end having the larger contact area disposed to squeeze said first diaphragm against said nozzle.

4. A combination as defined in claim 2 with the end having the smaller contact area disposed to squeeze said first diaphragm against said nozzle.

5. A combination as defined in claim 1 wherein said valve nozzle contact surface structure is rounded at the engagement contact surface with said diaphragm.

6. A combination as defined in claim 1 wherein a first said pressure control chamber is disposed to receive said fluid flow path through said valve and pass it therethrough for control by engagement of said diaphragm with said valve.

7. A combination as defined in claim 6 including a fluid flow source passing said fluid in a direction such that said fluid flow path enters said valve.

8. A combination as defined in claim 6 including a fluid flow source passing said fluid in a direction such that said fluid flow path enters said chamber and exits from said valve.

9. A combination as defined in claim 1 wherein the fluid pressure in said second chamber is varied within limits providing a substantially linear control of the output flow therefrom as a function of the pressure between said control member and said valve exerted through said diaphragm.

10. A fluid logic control device for controlling a fluid flow path in response to a fluid pressure control force, comprising in combination, a movable control member having two opposing ends thereof presenting two surface contact areas, a fluid flow valve structure disposed for control by one of said ends and presenting a nozzle with contact surface structure thereabout smaller in surface contact area than that of one said end, whereby that end will overlap the nozzle contact surface; a pair of impervious flexible diaphragms disposed to contact the opposite said ends of said control member thereby to move it when flexed thereagainst, said diaphragms and the contact surfaces thereof with said control member being relatively movable, a first one of said diaphragms being disposed between said control member and said valve structure, a pair of pressure control chambers disposed adjacent each diaphragm to receive fluid flow under pressure for flexing said diaphragms against respective ends of said control member to thereby move it in opposite directions as a function of differential fluid pressures in said two control chambers on said diaphragms, a fluid flow path through said valve in a first said chamber whereby said one end of said control member may squeeze said first diaphragm against said nozzle to control flow therethrough in response to differential pressure on said diaphragms in said pressure control chambers, and a housing holding said movable control member between said diaphragms for movement in and out of contact with said nozzle wherein a first said pressure control chamber is disposed to receive said fluid flow path through said valve and pass it therethrough, a fluid flow source passing said fluid in a direction such that said fluid flow path enters said chamber and exits from said valve, a feedback control path from said valve to the second said chamber to establish the pressure therein, a third pressure control chamber, a second movable control member movable therein, a third diaphragm for imparting movement to said second movable control member in response to fluid flow pressure into said third pressure control chamber, and means positioning said second control member through said valve to contact said first diaphragm and oppose movement of said first control member in a biasing sense responsive to fluid pressure in said third chamber.

11. A fluid logic control device for controlling a fluid flow path in response to a fluid pressure control force, comprising in combination, a movable control member having two opposing ends thereof presenting two surface contact areas, a fluid flow valve structure disposed for control by one of said ends and presenting a nozzle with contact surface structure thereabout smaller in surface contact area than that of one said end, whereby that end will overlap the nozzle contact surface; a pair of impervious flexible diaphragms disposed to contact the opposite said ends of said control member thereby to move it when flexed thereagainst, a first one being disposed between said control member and said valve structure, a pair of pressure control chambers disposed adjacent each diaphragm to receive fluid flow under pressure for flexing said diaphragms against respective ends of said control member, a fluid flow path through said valve in a first said chamber whereby said one end of said control member may squeeze said first diaphragm against said nozzle to control flow therethrough in response to differential pressure on said diaphragms in said pressure control chambers, and a housing holding said movable control member between said diaphragms for movement in and out of contact with said nozzle, said device being connected as a fluid flow amplifier having connected a restricted fluid flow path into said second chamber and having a larger fluid flow path through said valve, and means passing a flow of fluid through said valve and control means coupled to pass signals represented by fluid pressure variations into said second chamber of enough pressure to squeeze said control member against said diaphragm and valve thereby controlling the flow of fluid through said valve.

12. A fluid logic control device for controlling a fluid flow path in response to a fluid pressure control force, comprising in combination, a movable control member having two opposing ends thereof presenting two surface contact areas, a fluid flow valve structure disposed for control by one of said ends and presenting a nozzle with contact surface structure thereabout smaller in surface contact area then that of one said end, whereby that end will overlap the nozzle contact surface; a pair of impervious flexible diaphragms disposed to contact the opposite said ends of said control member thereby to move it when flexed thereagainst, a first one being disposed between said control member and said valve structure, a pair of pressure control chambers disposed adjacent each diaphragm to receive fluid flow under pressure for flexing said diaphragms against respective ends of said control member, a fluid flow path through said valve in a first said chamber whereby said one end of said control member may squeeze said first diaphragm against said nozzle to control flow therethrough in response to differential pressure on said diaphragms in said pressure control chambers, and a housing holding said movable control member between said diaphragms for movement in and out of contact with said nozzle, said device being connected as a pressure dividing circuit providing an output pressure that varies fractionally as a function of the input pressure, including an input signal source passing fluid under pressure into the first of said control chambers and out said valve, a feedback path for fluid flowing from said valve into said second chamber to establish therein a control pressure substantially that of fluid flow out said valve, an output circuit deriving an output signal flow path from fluid flowing out said valve, and wherein said control member has one end area larger than the other and disposed to contact the diaphragm deflected by fluid in said second chamber, whereby the pressure of fluid flow in said output circuit is a fraction of said input fluid flow which is a function of the relative areas of said two ends.

13. A fluid logic control device for controlling a fluid flow path in response to a fluid pressure control force, comprising in combination, a movable control member having two opposing ends thereof presenting two surface contact areas, a fluid flow valve structure disposed for control by one of said ends and presenting a nozzle with contact surface structure thereabout smaller in surface contact area than that of one said end, whereby that end will overlap the nozzle contact surface; a pair of impervious flexible diaphragms disposed to contact the opposite said ends of said control member thereby to move it when flexed thereagainst, a first one being disposed between said control member and said valve structure, a pair of pressure control chambers disposed adjacent each diaphragm to receive fluid flow under pressure for flexing said diaphragms against respective ends of said control member, a fluid flow path through said valve in a first said chamber whereby said one end of said control member may squeeze said first diaphragm against said nozzle to control flow therethrough in response to differential pressure on said diaphragms in said pressure control chambers, and a housing holding said movable control member between said diaphragms for movement in and out of contact with said nozzle, said nozzle being connected as a thyratron type latching circuit providing a triggered output flow that is controlled after triggering only by removal of the output flow source, including a source of fluid, a flow path coupled to said source passing into said valve and out said first chamber, and a trigger signal fluid flow source coupled to said second chamber, wherein the two ends of said control member are of different area and the end with the largest area is disposed to squeeze said first diaphragm against said nozzle.

14. A fluid logic control device for controlling a fluid flow path in response to a fluid pressure control force, comprising in combination, a movable control member having two opposing ends thereof presenting two surface contact areas, a fluid flow valve structure disposed for control by one of said ends and presenting a nozzle with contact surface structure thereabout smaller in surface contact area than that of one said end, whereby that end will overlap the nozzle contact surface; a pair of impervious flexible diaphragms disposed to contact the opposite said ends of said control member thereby to move it when flexed thereagainst, a first one being disposed between said control member and said valve structure, a pair of pressure control chambers disposed adjacent each diaphragm to receive fluid flow under pressure for flexing said diaphragms against respective ends of said control member, a fluid flow path through said valve in a first said chamber whereby said one end of said control member may squeeze said first diaphragm against said nozzle to control flow therethrough in response to differential pressure on said diaphragms in said pressure control chambers, and a housing holding said movable control member between said diaphragms for movement in and out of contact with said nozzle, said device being connected as a threshold detector including a source of fluid signals, a flow path passing signals from said source through said valve, a signal source coupled to pass signals of varying pressure into said second chamber, means deriving an output signal from said flow path from said source, means including a third chamber with a second movable member therein and a third diaphragm for moving it, a biasing pressure source coupled to said third chamber for flexing the third diaphragm to tend to move said second member, said second member being disposed to extend one end through said valve to oppose the force on said first member tending to squeeze the first diaphragm against said valve and said second member having an end area engaging said third diaphragm of greater area than that end area extending through said valve.

15. A fluid flow control device comprising in combination, a pair of spaced thin flexible elastomeric diaphragms, means responsive to input control signals to flex the diaphragms toward each other, a movable control member having two ends positioned to intercept the respective diaphragms over a portion of the diaphragm area for movement thereby, and a fluid flow valve nozzle controlled by interaction of one of said diaphragms therewith in response to movement of said control member by the other one of said diaphragms connected as a "Not" circuit for inverting signals, wherein said means responsive to input control signals comprise a supply source of fluid under constant pressure connected in a path to flex said diaphragms toward each other, a resistor restriction connected in the path to that diaphragm controlling the nozzle, an output connection in the path between said resistor and said nozzle, said control member having its two ends so proportioned that said nozzle is closed by interacting said diaphragm thereby providing an output pressure at said output connection at the supply pressure, said combination further including a vent from said nozzle, a further control member with two ends, one end of which passes through said nozzle to engage said interacting diaphragm, a further flexible diaphragm engaging the remaining end of said further control member, and a signal source flexing said further diaphragm when fluid pressure is applied to open said nozzle and reduce fluid pressure at said output connection by venting said supply source through said resistor and vent.

* * * * *